United States Patent [19]

Diederichs

[11] Patent Number: 4,538,345

[45] Date of Patent: Sep. 3, 1985

[54] METHOD FOR THE MANUFACTURE OF A PACK OF COATED METAL LAMINAS FOR ELECTRICAL MACHINERY AND APPLIANCES

[75] Inventor: Arthur Diederichs, Wuerzburg, Fed. Rep. of Germany

[73] Assignee: Siemens Aktiengesellschaft, Munich and Berlin, Fed. Rep. of Germany

[21] Appl. No.: 591,308

[22] Filed: Mar. 19, 1984

[30] Foreign Application Priority Data

Mar. 31, 1983 [DE] Fed. Rep. of Germany ....... 3311852

[51] Int. Cl.$^3$ ............................................. H02K 15/02
[52] U.S. Cl. ........................................ 29/596; 29/609
[58] Field of Search ................... 29/596, 609; 310/42, 310/216, 217

[56] References Cited

U.S. PATENT DOCUMENTS 3,202,851  8/1965  Zimmerle et al. ................... 310/259
4,438,458  3/1984  Mitsui .............................. 29/609 X

*Primary Examiner*—Carl E. Hall

*Attorney, Agent, or Firm*—F. W. Powers; J. L. James

[57] ABSTRACT

A method for the manufacture of plate-packs of coated metal laminas for electrical machinery and appliances in which the number of necessary manufacturing steps is reduced. After the laminas have been punched or stamped out, they are electrically upgraded by annealing and in the process are arranged at intervals with respect to one another and exposed to a reducing gaseous atmosphere. Then projections or depressions, known from punch-packing processes, which correspond to each other are punched into the laminas to connect them together. The laminas of a plate-pack are assembled into a unit by means of the interlocking projections and depressions prior to the annealing by an initial axial pressing step with an ensured axial minimum separation. After the annealing treatment, by means of a final axial pressing step, they are assembled into the final plate-pack form. The resulting plate-packs are particularly well suited for laminated stator or rotor packs for small electric motors or for electromagnetic switch gear.

8 Claims, 4 Drawing Figures

METHOD FOR THE MANUFACTURE OF A PACK OF COATED METAL LAMINAS FOR ELECTRICAL MACHINERY AND APPLIANCES

BACKGROUND OF THE INVENTION

The invention relates to a method for the manufacture of a pack of coated metal laminas for electrical machinery and appliances in which the laminas are punched out, arranged at a distance from one another, exposed in an annealing furnace to a reducing gaseous atmosphere, and then assembled in the final plate-pack form.

The well-known process (see German patent DE-AS No. 14 33 774) for manufacturing rotor and stator plates for electrical machinery by means of annealing in a reducing atmosphere after the plates have been punched includes stamping stator or rotor plates out of a steel plate with higher electrical losses than are present in ordinary dynamo plates of a hardness suitable for stamping purposes, placing them in a continuous furnace where they are hung on rods in a reducing atmosphere of about 800° C., and subsequently cooling them to about 550° to 650° C. They are then provided at this temperature, in an oxidizing gaseous atmosphere, with an insulating overlay; next the plates that have been electrically upgraded in this manner are coated, pressed together with plane-parallel faces, and fastened in place, for example by rivets, screws or welding, according to a predetermined plate-pack index, such as the number of laminas per pack, or the weight or height of the pack.

A method is also already known (e.g. U.S. Pat. No. 3,202,851) for providing the metal laminas, when they are punched out, with projections or depressions corresponding to one another, by means of which the individual laminas of a pack can be pressed together into a solid unit, since the projections of one plate hook into the depressions of the other plate that is pressed onto it, with mutual positive or non-positive locking, as the case may be.

Another process (e.g. German patent DE-GM No. 18 82 073) is to insert, when the laminas are being coated, at least one plate each time until the predetermined height of the plate-pack is reached. In this case each plate has instead of a projection, only an enlarged hole so that the plates adjacent to this intermediate plate do not hook into one another, and, in a packing device, the plate-packs can be automatically separated after their predetermined size has been achieved.

SUMMARY OF THE INVENTION

It is the object of the present invention to simplify the manufacture of packs of coated metal laminas which must be exposed, after being punched out, to an annealing process with a gaseous atmosphere that flows over the surface of the laminas.

It is a further object of the invention to facilitate automation of the manufacturing process by reducing the number of the individual processing and assembly steps.

In general, the invention features a method for the manufacture of a pack of coated metal laminas for electrical machinery and appliances in which the laminas, after being punched out, are arranged at a distance from one another, exposed in an annealing furnace to a reducing gaseous atmosphere and then assembled in the final plate-pack form, which includes:

(a) punching or stamping projections and depressions, corresponding to one another, in the laminas for the mutual connection of the laminas to be assembled into a plate-pack;

(b) assembling the laminas of a plate-pack by an initial axial depressing step, prior to annealing, into a unit with an ensured minimum axial separation by means of the interlocking projections and depressions; and (c) assembling the laminas, after annealing into the final plate-pack form by a final axial pressing step.

In preferred embodiments of the invention the distance stops are punched or stamped into the laminas, and they form a stable separation between the laminas during the initial pressing step and can be bent into the plane of their respective laminas during the final pressing step; arranging the distance stops of successive laminas in a plate-pack so they are displaced with respect to one another in an alternating sequence; using the tabs on the perimeter of a lamina, the inner side of which is radially connected with the lamina and the outer side of which is stamped free and bent out, as distance stops; coating the laminas of plate-pack without any shift; and subjecting a plate-pack to impregnation with self-curing casting resin after the plate-pack has been coated and pressed to give it plane-parallel faces.

The method of the invention permits the use of the conventional punch-packing process. This process utilizes a simple method of forming the plate-pack and fixing the position of the laminas with respect to one another directly after they have been punched out. Therefore, it is not necessary to forego the advantages of using inexpensive plates and the consequent necessity of treating the punched out laminas in a reducing atmosphere that requires free access to the entire surface of the laminas; in an initial pressing step, a sufficiently secure connection among the laminas of a plate-pack is achieved. Additionally, the initial pressing step achieves a sufficient distance between the individual laminas to permit the effective entry of a reducing atmosphere for the electrical upgrading of the plate, and, if necessary, to permit the entry of an additional oxidizing gaseous atmosphere for an insulating overlay. By means of a subsequent pressing, the plate-pack is then pressed axially together into its final form by pressure members guided plane-parallel to one another, which exert pressure on both faces of the pack.

As an easy method of ensuring the minimum separation required between the laminas, while exerting in the initial step, without the need for expensive monitoring or control procedures, an axial pressure that is sufficient but not excessive, it is advantageous to provide distance stops that are axially punched and/or stamped out in the laminas. These stops form, in the initial pressing step, stable separators between the laminas, but can be bent back, in the final pressing step into the plane of their respective laminas; it is desirable for this purpose to have the distance stops include tabs arranged radially on the outer edge of a lamina, with the inner part of the tabs being connected with the lamina, and the outer part of the tabs being punched free and bent out. A separation achieved with the distance stops is only possible if they do not lie directly above one another in the packed plate-pack; they should instead be punched or stamped with an alternating displacement in successive pairs of laminas in a plate-pack.

In order to further reduce the expense of the method of the invention, the laminas of a plate-pack should be coated without any shift; the intermediate spaces which, after the faces of the plates have been pressed together by plane-parallel pressure, may occur on one side of this pack as the result of variations in the thickness of the strips of metal plate used in the stamping are filled with casting resin. This filling can take place during the customary impregnation of the finished plate-pack with casting resin.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
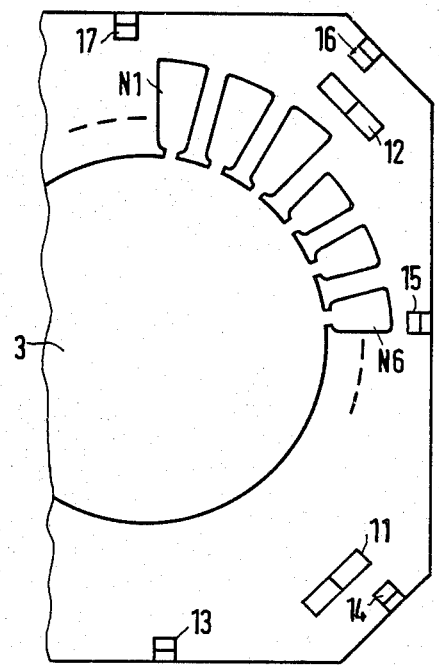
FIG. 1 shows a partial top view of a first lamina.
Figure 2:
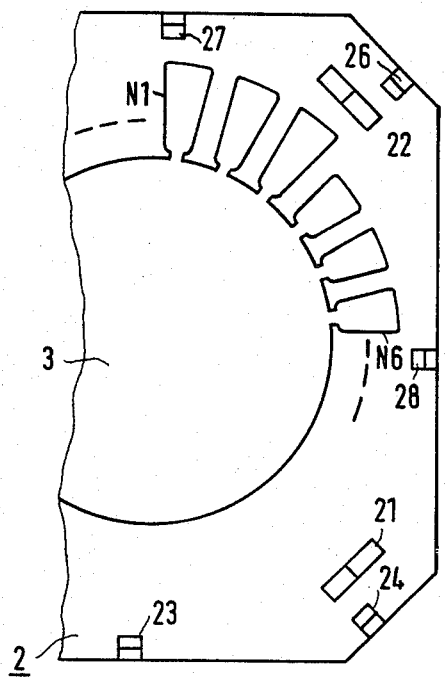
FIG. 2 shows a partial top view of a second lamina.

FIGS. 1 and 2 show, respectively, a top view of metal laminas 1 and 2 for a stator plate-pack. Along the circumference of hole 3, notches have been stamped to receive the stator windings (only notches N1 to N5 are shown here).

Figure 3:
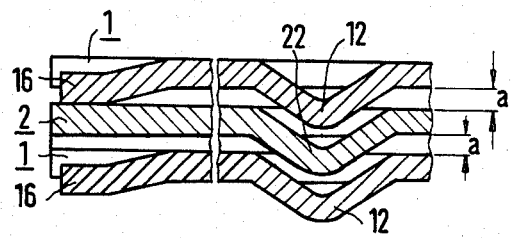
FIG. 3 shows an enlarged detailed cross section of a coated plate-pack that has been subjected to the initial pressing step.
Figure 4:
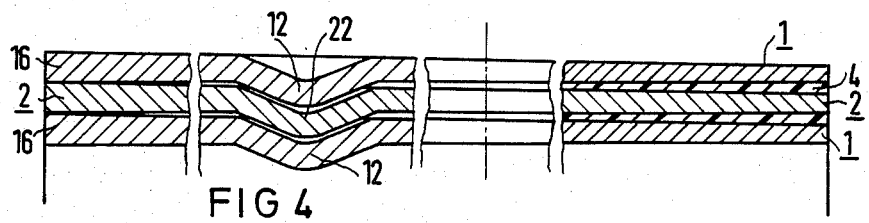
FIG. 4 shows an enlarged detailed cross section of a coated plate-pack that has been subjected to the final pressing step.

At intervals on the perimeter on laminas 1, 2 there have been punched or stamped tongues 11, 12 and 21, 22 respectively, in order to form projections or depressions to assemble the laminas according to the punch-packing process. As shown in FIGS. 3 and 4, the long sides of tongues 11, 12 and 21, 22 have been stamped free, while at their narrow front ends they remain integrally connected with laminas 1 and 2 respectively, at the level of the latter. Furthermore, tongues 11, 12 and 21, 22 have been pressed out in the areas that have been stamped free between the front ends, to form tapered axial projections above the level of laminas 1 and 2.

When the individual laminas are packed into a plate-pack in accordance with the punch-stamping process, tongue 12, which has been pressed out of lamina 1, fits into the slit-shaped opening that has been formed in following lamina 2 as a result of the pressing out of tongue 22; it then locks positively and/or non-positively with the side edges of this opening. The same type of connection is repeated (as shown in FIG. 3) through the hooking of the tip of tongue 22 of lamina 2 when it fits into the opening of the lamina that lies under it, and which is formed in exactly the same way as lamina 1.

FIG. 3 shows a section of a plate-pack whose laminas 1, 2, 1 have been assembled by an initial pressing step with a minimum interval a between them and which can be put as a unit into an annealing furnace for treatment in a reducing gaseous atmosphere. To ensure the minimum interval a in a simple manner, tabs 13–17 and 23–27 are arranged as distance stops on the perimeter of the respective laminas 1 and 2 with their inner edges connected radially with the lamina and their outer edges stamped free and bent out axially. Tabs 13–17 on lamina 1 have been displaced at the edge with respect to tabs 23–27 of the next lamina 2 in the plate-pack so that (as shown in FIG. 3) the parts of the distance stops that are axially bent out on the outer side from the plane of the laminas in each case can come in contact only with a flat part of the next lamina, which has not been bent out.

FIG. 4 shows the assembled plate-pack (which is shown in FIG. 3 after the initial pressing step) after the final pressing step. In the final pressing step, the pressure of a pressing device that acts on the two faces of the plate-pack in a plane-parallel direction is increased to such an extent that tabs 13–17 and 23–27 that had been bent out are now bent back into the plane of their respective laminas 1 and 2.

Because the metal strips or plates from which laminas 1, 2 have been punched out may not be uniformly thick over their entire width, and, according to a refinement of the invention to simplify the punch-packing of the laminas of a plate-pack, are coated without any shift (as illustrated in the right-hand part of the cross section shown in FIG. 4) intermediate spaces may occur between the laminas, while on the left, or outer, side of the plate-pack the laminas are in close contact with one another. According to a refinement of the invention, it is recommended that the plate-pack, which has thus been annealed and punch-packed in the simplest possible manner, be subjected to impregnation with a self-curing casting resin, so that the intermediate spaces are filled with casting resin and a firm intermediate layer of casting resin 4 is formed between the laminas. In this manner, without sacrificing the simplest possible manufacturing and still manufacturing perfect parallelism between the faces of the plate-pack, the solidity of the unit is further assured, even when it is exposed to the pressure of the bearing plate that exerts axial force upon it during the final assembly of the motor.

There has thus been shown and described a novel method for the manufacture of a pack of coated metal laminas for electrical machinery and appliances, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a method for the manufacture of a pack of coated metal laminas for electrical machinery and appliances in which the laminas, after being punched out, are arranged at a distance from one another, exposed in an annealing furnace to a reducing gaseous atmosphere and then assembled in the final plate-pack form, the improvement comprising the steps of:
   (a) punching or stamping projections and depressions, corresponding to one another, in the laminas for the mutual connection of the laminas to be assembled into a plate-pack;
   (b) assembling the laminas of the plate-pack by an initial axial pressing step, prior to annealing, into a unit with an ensured minimum axial separation by means of the interlocking projections and depressions; and
   (c) assemblying the laminas, after annealing into the final plate-pack form by a final axial pressing step.

2. The method according to claim 1, further comprising punching or stamping distance stops into the laminas, which forms a stable separation between the laminas during the initial pressing step, and can be bent back into the plane of their respective laminas during the final pressing step.

3. The method according to claim 2, comprising arranging the distance stops of successive laminas in a plate-pack displaced with respect to one another in an alternating sequence.

4. The method according to claim 2, comprising using tabs on the perimeter of a lamina, the inner side of which is radially connected with the lamina and the outer side of which is stamped free and bent out, as distance stops.

5. The method according to claim 3, comprising using tabs on the perimeter of a lamina, the inner side of which is radially connected with the lamina and the outer side of which is stamped free and bent out, as distance stops.

6. The method according claim 1, comprising coating the laminas of a plate-pack without any shift.

7. The method according to claim 4, comprising subjecting the plate-pack to impregnation with self-curing casting resin after the plate-pack has been coated and pressed to give it plane-parallel faces.

8. The method according to claim 5, comprising subjecting the plate-pack to impregnation with self-curing casting resin after the plate-pack has been coated and pressed to give it plane-parallel faces.

* * * * *